United States Patent
Quinney (10) Patent No.: US 11,622,497 B2
(45) Date of Patent: *Apr. 11, 2023

(54) MOUNTING ASSEMBLY FOR A PRODUCT DISTRIBUTION SYSTEM OF AN AIR CART

(71) Applicant: CNH Industrial Canada, Ltd., Saskatoon (CA)

(72) Inventor: Timothy David Quinney, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 510 days.

This patent is subject to a terminal disclaimer.

(21) Appl. No.: 16/656,252

(22) Filed: Oct. 17, 2019

(65) Prior Publication Data

US 2021/0112700 A1    Apr. 22, 2021

(51) Int. Cl.
*A01C 7/08* (2006.01)
*A01C 7/20* (2006.01)

(52) U.S. Cl.
CPC .............. *A01C 7/082* (2013.01); *A01C 7/201* (2013.01)

(58) Field of Classification Search
CPC ......... A01C 7/082; A01C 7/201; A01C 7/081; A01C 7/08; A01C 7/00; A01C 7/20
See application file for complete search history.

(56) References Cited

U.S. PATENT DOCUMENTS

| | | |
|---|---|---|
| 1,004,942 A | 10/1911 | Tinsman |
| 3,662,962 A | 5/1972 | Cobey |
| 4,145,980 A | 3/1979 | Boots |
| 4,155,315 A | 5/1979 | Dobbins |
| 5,082,217 A | 1/1992 | Parker et al. |
| 5,346,019 A | 9/1994 | Kinzenbaw et al. |
| 5,598,795 A | 2/1997 | House |
| 5,855,303 A | 1/1999 | Gregor |
| 5,913,369 A * | 6/1999 | Bodie ................... A01C 15/04 172/311 |
| 6,050,743 A | 4/2000 | Medinger |
| 7,306,175 B1 | 12/2007 | Farmer |
| 7,765,944 B2 | 8/2010 | Wilson |

(Continued)

FOREIGN PATENT DOCUMENTS

| | | | |
|---|---|---|---|
| CN | 110178493 A * | 8/2019 | ........... A01C 15/005 |
| EP | 0940070 A1 | 9/1999 | |

(Continued)

OTHER PUBLICATIONS

U.S. Appl. No. 16/569,283, filed Sep. 12, 2019, Gregory James Johnson.

*Primary Examiner* — Christopher J. Novosad
(74) *Attorney, Agent, or Firm* — Rebecca Henkel; Rickard DeMille (57) ABSTRACT

A product distribution system mounting assembly includes a first member configured to rigidly couple to a frame of an agricultural apparatus and a second member configured to rigidly couple to a plurality of tubular components of a product distribution system of the agricultural apparatus. The first member and the second member are configured to engage with one another to form a sliding interface that enables the plurality of tubular components to move along a vertical axis relative to the frame as the agricultural apparatus moves in a direction of travel through a field.

20 Claims, 10 Drawing Sheets

(56) References Cited

U.S. PATENT DOCUMENTS

| | | |
|---|---|---|
| 8,683,930 B2 | 4/2014 | Cresswell et al. |
| 8,684,649 B2 | 4/2014 | Redekop |
| 9,539,927 B2 | 1/2017 | Fitzgerald et al. |
| 9,549,498 B2 | 1/2017 | Olivares |
| 9,578,800 B2 | 2/2017 | Beaujot et al. |
| 10,194,578 B2 | 2/2019 | Williams |
| 2004/0250742 A1 | 12/2004 | Fuessel et al. |
| 2018/0000007 A1 | 1/2018 | Williams |
| 2019/0033895 A1 | 1/2019 | Thompson et al. |
| 2019/0357417 A1 | 11/2019 | Chahley et al. |
| 2020/0053950 A1 | 2/2020 | Limaye et al. |

FOREIGN PATENT DOCUMENTS

| | | | |
|---|---|---|---|
| EP | 3366133 A1 | 8/2018 | |
| WO | WO-2018203157 A1 * | 11/2018 | ............... A01C 7/08 |

* cited by examiner

MOUNTING ASSEMBLY FOR A PRODUCT DISTRIBUTION SYSTEM OF AN AIR CART

BACKGROUND

The present disclosure relates generally to a mounting assembly.

Generally, agricultural seeding implements are towed behind a work vehicle, such as a tractor. These agricultural seeding implements may include multiple row units that excavate trenches into soil and deposit particulate material, such as seeds and/or fertilizer, into the trenches. In this manner, rows of the particulate material may be established throughout a field. The particulate material may be stored in a central location, such as in a storage compartment of an air cart, and the particulate material may be distributed from the central location to each of the row units for deposition into the soil.

BRIEF DESCRIPTION

In one embodiment, a product distribution system mounting assembly includes a first member configured to rigidly couple to a frame of an agricultural apparatus and a second member configured to rigidly couple to a plurality of tubular components of a product distribution system of the agricultural apparatus. The first member and the second member are configured to engage with one another to form a sliding interface that enables the plurality of tubular components to move along a vertical axis relative to the frame as the agricultural apparatus moves in a direction of travel through a field.

In one embodiment, a product distribution system mounting assembly includes at least one bracket configured to rigidly couple to a frame of an air cart and at least one crossbar configured to rigidly couple to a plurality of tubular components of a product distribution system of the air cart. The product distribution system mounting assembly also includes a first member integrally formed with or rigidly coupled to the at least one bracket and a second member integrally formed with or rigidly coupled to the at least one crossbar. The first member and the second member are configured to engage one another to form a sliding interface that enables the plurality of tubular components to move along a vertical axis relative to the frame as the air cart moves in a direction of travel through a field.

In one embodiment, an air cart includes a frame, a storage compartment supported on the frame and configured to store a particulate material, and a product distribution system configured to distribute the particulate material from the storage compartment to an agricultural implement. The air cart also includes a product distribution system mounting assembly that includes a first member configured to rigidly couple to the frame and a second member configured to rigidly couple to a tubular component of the product distribution system. The first member and the second member are configured to engage with one another to form a sliding interface that enables the tubular component to move along a vertical axis relative to the frame as the air cart moves in a direction of travel through a field.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain agricultural implements (e.g., seeding implements) may distribute a particulate material (e.g., seeds and/or fertilizer) to multiple row units (e.g., ground engaging opener assemblies). Additionally, each row unit may engage the ground to excavate a trench into soil, and each row unit may deposit the particulate material into the trench. In this manner, rows of the particulate material may be established throughout a field. Generally, each row unit does not provide adjustable control over the deposition of the particulate material. Instead, each row unit may receive fluidized particulate material via a respective line (e.g., tubular line; pipe; hose; conduit). In addition, each row unit may enable received particulate material to drop into the trench via gravity. Accordingly, the rate at which particulate material is deposited into the soil by each row unit may be based on various parameters, such as the diameter of the line and/or the flow rate of the fluidized particulate material to the row unit.

The particulate material may be stored in a centralized location, such as in a storage compartment of an air cart, for distribution to each row unit. In certain embodiments, the centralized location is pressurized. In addition, the particulate material distribution from the centralized location may be controlled via a product distribution system that includes a metering system with meter roller(s) and that includes one or more tubular components (e.g., lines, connectors) that extend between the metering system of the air cart and a header of the agricultural implement. In certain embodiments, a weight measurement system may be employed to monitor the weight of the particulate material within the storage compartment. It should be appreciated that the weight of the particulate material within the storage compartment may be utilized in various ways (e.g., to inform an operator of an amount of the particulate material within the storage compartment; to determine a need to refill the storage compartment).

In order to monitor the weight of the particulate material within the storage compartment, one or more strain gauges (e.g., load cells) may be positioned on the air cart. The one or more strain gauges may be positioned at any location relative to the air cart that enables the one or more strain gauges to output a signal indicative of the weight of the particulate material within the storage compartment. For example, in some embodiments, the storage compartment may be coupled to a frame of the air cart by one or more storage compartment mounting assemblies, and the one or more strain gauges may be supported within the one more storage compartment mounting assemblies. In such cases, each strain gauge may output a signal that is indicative of a magnitude of bending of a portion of the respective storage compartment mounting assembly. A controller communicatively coupled to each strain gauge may receive the respective signal(s), determine the vertical load applied to each storage compartment mount based on the respective signal(s), and then determine the weight of the storage compartment, which includes the weight of the particulate material within the storage compartment, based on the vertical load(s).

However, it is now recognized that a rigid or fixed connection between the product distribution system of the air cart and the frame of the air cart (e.g., a connection that blocks relative movement between the product distribution system of the air cart and the frame of the air cart) may result in inaccurate measurement of the weight of the particulate material within the storage compartment. For example, with a rigid or fixed connection between the product distribution system of the air cart and the frame of the air cart, forces exerted on the frame of the air cart (e.g., due to rough terrain; due to articulation of a hitch connection between the air cart and the agricultural implement) may be transferred through the product distribution system to the one or more strain gauges, thereby resulting in inaccurate measurement of the weight of the particulate material within the storage compartment.

Accordingly, the disclosed embodiments provide a product distribution system mounting assembly that supports components of the product distribution system of the air cart. In certain embodiments, the product distribution system mounting assembly is coupled to and supports the one or more tubular components that extend between the metering system of the air cart and the header of the agricultural implement. The product distribution system mounting assembly enables the one or more tubular components to move vertically relative to the frame of the air cart, thereby protecting (e.g., insulating, isolating) the one or more strain gauges from certain external forces (e.g., due to movement of the agricultural implement that is coupled to the air cart). In this way, the product distribution system mounting assembly facilitates accurate measurement of the weight of the particulate material within the storage compartment via the weight measurement system. The product distribution system mounting assembly is designed to fit within a small space, which may be particularly helpful in an embodiment in which the air cart is towed between the agricultural implement and the work vehicle. However, the product distribution system mounting assembly disclosed herein may also be utilized when the air cart is towed behind the agricultural implement. It should be appreciated that the features disclosed herein may be utilized with air carts or with any of a variety of other agricultural apparatuses that store and distribute materials.

Figure 1:
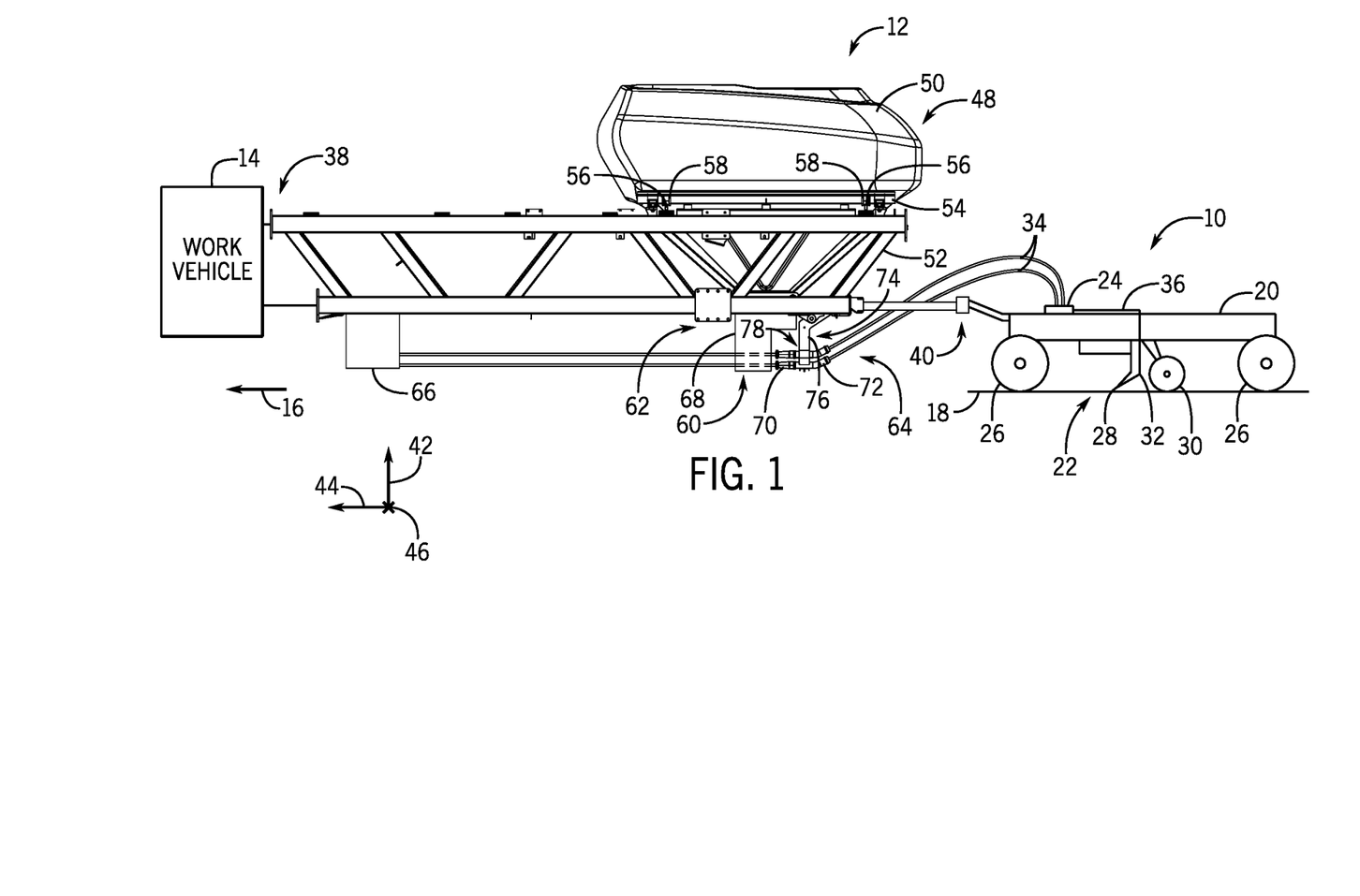
FIG. 1 is a side view of an embodiment of an agricultural implement coupled to an air cart.

FIG. 1 is a side view of an embodiment of an agricultural implement 10 coupled to an air cart 12. The agricultural implement 10 and the air cart 12 may be pulled by a work vehicle 14 (e.g., a tractor) in a direction of travel 16. To facilitate discussion and for visibility of certain features, the air cart 12 is shown without wheels and the work vehicle 14 is illustrated schematically. However, it should be appreciated that the air cart 12 may be supported on a soil surface 18 via wheels and that the work vehicle 14 may have any of a variety of physical forms.

As depicted, the agricultural implement 10 includes a tool frame 20 coupled to a row unit 22 (e.g., ground engaging opener assembly), a header 24, and wheel assemblies 26. As the agricultural implement 10 and the air cart 12 are pulled by the work vehicle 14 in the direction of travel 16, a row of particulate material may be deposited into the soil by the row unit 22. Although only one row unit 22 is shown, the agricultural implement 10 may include multiple row units 22 organized in one or more rows across the agricultural implement 10. In some embodiments, the agricultural implement 10 may include one or more rows of 12, 14, 16, 18, 20, or more row units 22, which may each deposit a respective row of particulate material into the soil.

To facilitate depositing the particulate material, each row unit 22 may include an opener 28, a press wheel 30, and a particulate material tube 32. While the opener 28 engages the soil, the opener 28 may exert a force onto the soil that excavates a trench into the soil as the row unit 22 travels through the field. The particulate material may be deposited into the excavated trench via the particulate material tube 32. Then, the press wheel 30 may pack soil onto the deposited particulate material.

The header 24 may provide the particulate material to the row units 22. In some embodiments, the header 24 may pneumatically distribute the particulate material from one or more primary lines to one or more secondary lines. For example, primary lines 34 may direct the particulate material from the air cart 12 to the header 24, and the header 24 may then distribute the particulate material to one or more row units 22 via respective secondary lines 36. It should be appreciated that the agricultural implement 10 shown in FIG. 1 is merely exemplary and that any of a variety of agricultural implements having any of a variety of features may be used with the air cart 12 having the features disclosed herein. For example, at least one row unit 22 on the agricultural implement 10 may include an applicator assembly configured to deposit the particulate material onto the soil surface 18 or any other suitable type of material deposition assembly. Additionally or alternatively, one or more primary lines 34 may provide the particulate material to one or more headers 24 and/or one or more secondary lines 36 may extend from each header 24. Furthermore, the header 24 may be coupled to any other suitable location on the agricultural implement 10 or on the air cart 12.

In the illustrated embodiment, the air cart 12 is towed between the agricultural implement 10 and the work vehicle 14 in the direction of travel 16. For example, the air cart 12 may be coupled to the work vehicle 14 by a first hitch assembly 38, and the air cart 12 may be coupled to the agricultural implement 10 by a second hitch assembly 40. However, in other embodiments, the air cart 12 may be towed behind the agricultural implement 10. In further embodiments, the agricultural implement and the air cart may be part of a single unit that is towed behind the work vehicle or may be elements of a self-propelled vehicle. Furthermore, in addition to the direction of travel 16, the components of the agricultural implement 10, the air cart 12, and the work vehicle 14 may be described with reference to a vertical axis or direction 42, a longitudinal axis or direction 44 (e.g., parallel to a direction of travel), and a lateral axis or direction 46.

The air cart 12 may centrally store particulate material and distribute the particulate material to the header 24. The air cart 12 may include a storage assembly 48 with a storage compartment 50 supported by a frame 52. In the illustrated embodiment, the storage compartment 50 includes angled surfaces on opposed lateral sides of a portion of the storage compartment 50, and the storage assembly 48 also includes supports 54 that engage the angled surfaces. As shown, the supports 54 are also coupled to the frame 52 by one or more storage compartment mounting assemblies 56. Each support 54 may be coupled to the frame 52 by two storage compartment mounting assemblies 56. However, in alternative embodiments, each support 54 may be coupled to the frame 52 by more or fewer storage compartments mounting assemblies 56 (e.g., 1, 2, 3, 4, 5, or more). The entire weight of the storage assembly 48 (including any particulate material within the storage compartment 50) is transferred to the frame 52 by the storage compartment mounting assemblies 56. Accordingly, each storage compartment mounting assembly 56 may include a strain gauge 58 (e.g., load cell) configured to output a signal indicative of a magnitude of bending of a member of the storage compartment mounting assembly 56. A controller may receive the signal(s) and determine a vertical load supported by each storage compartment mounting assembly 56. The vertical load(s) may be utilized to determine the measured weight of the storage assembly 48, and the weight of the particulate matter within the storage compartment 50 may be derived from the measured weight of the storage assembly 48. The measured weight of the storage assembly 48 may be determined substantially continuously or periodically throughout the seeding operation to monitor the amount of particulate material applied to the field. The configuration of the storage assembly 48 and the weight measurement system is merely exemplary, and it should be appreciated that one or more strain gauges 58 may be positioned at any of a variety of locations that enable the one or more strain gauges to monitor the weight of the particulate material within the storage compartment 50.

The air cart 12 also includes a product distribution system 60, which may include a metering system 62 and a tubing assembly 64. The metering system 62 may include one or more meter rollers that meter the particulate material from the storage compartment 50 into the tubing assembly 64, which carries the particulate material to the agricultural implement 10. In some embodiments, the particulate material may be fed from the metering system 62 into an air flow within the tubing assembly 64 (e.g., provided by an air source 66, such as a blower or fan powered by an electric or hydraulic motor); and the air flow may carry the particulate material to the agricultural implement 10.

As shown, the metering system 62 may include a housing 68 that surrounds (e.g., houses) the one or more meter rollers and that is coupled (e.g., rigidly coupled; in a fixed position relative to; fastened via one or more fasteners, such as bolts) to the storage compartment 50. Furthermore, the tubing assembly 64 may include one or more tubular components that extend from the housing 68 of the metering system 62 to the header 24 of the agricultural implement 10. As shown, the tubing assembly 64 includes one or more metering system lines 70, one or more connectors 72, and the one or more primary lines 34. The one or more metering system lines 70 may extend between and fluidly, couple the housing 68 of the metering system 62 and the one or more connectors 72. The one or more connectors 72 may extend between and fluidly couple the one or more metering system lines 70 and the one or more primary lines 34. The one or more primary lines 34 may extend between and fluidly couple the one or more connectors 72 and the agricultural implement 10 (e.g., to the one or more headers 24 of the agricultural implement 10). In some embodiments, the one or more metering system lines 70 and/or the one or more connectors 72 are rigid structures (e.g., more rigid than the one or more primary lines 34), and the one or more primary lines 34 are flexible structures (e.g., more flexible than the one or more metering system lines 70 and/or the one or more connectors 72). It should be appreciated that each of the tubular components disclosed herein may be a one-piece tubular structure or may include multiple sections (e.g., multiple separable tubular sections) that are coupled to one another. For example, the metering system lines 70 may include a first tubular section and a second tubular section that are coupled to one another to fluidly couple the housing 68 of the metering system 62 and the one or more connectors 72. Similarly, the physically separate tubular components disclosed herein may be combined or formed as a one-piece structure. For example, instead of a physically separate metering system line 70 and connector 72, these tubular components may be a single tubular component that extends from the housing 68 to couple to the primary line 34.

As shown, the product distribution system 60 is supported by and coupled to the frame 52 of the air cart 12 via a product distribution system mounting assembly 74. In some embodiments, an air cart storage and distribution assembly formed by the storage compartment 50 and the product distribution system 60 is supported by and coupled to the frame 52 of the air cart 12 only by the storage compartment mounting assembly 56 and the product distribution system mounting assembly 74 (e.g., the entire weight of the storage compartment 50 and the product distribution system 60 is supported only by the storage compartment mounting assembly 52 and the product distribution system mounting assembly 74; without other support or contact points with the frame 52 of the air cart 12).

In the illustrated embodiment, the product distribution system mounting assembly 74 is positioned vertically below the storage compartment 50 (e.g., between the storage compartment 50 and the soil surface 18 along the vertical axis 42) and between the metering system 62 and the agricultural implement 10 along the longitudinal axis 44. As shown, the product distribution system mounting assembly 74 includes brackets 76 that are coupled (e.g., rigidly coupled; in a fixed position relative to; fastened via one or more fasteners, such as threaded wires or bolts) to the frame 52 of the air cart 12. As discussed in more detail below; the product distribution system mounting assembly 74 also includes a sliding interface 78 that enables the one or more connectors 72 (and components coupled thereto, such as the one or more metering system lines 70 and the housing 68 of the metering system 62) to move vertically relative to the brackets 76 and relative to the frame 52 of the air cart 12. In this way; the sliding interface 78 protects (e.g., insulates, isolates) the one or more strain gauges 58 from certain external forces (e.g., due to movement of the agricultural implement 10 that is coupled to the air cart 12). Thus, the product distribution system mounting assembly 74 facilitates accurate measurement of the weight of the particulate material within the storage compartment 50 via the weight measurement system (e.g., the one or more strain gauges 58 and associated processing components).

It should be appreciated that the air cart 12 shown in FIG. 1 is merely exemplary and that the air cart 12 may have any of a variety of features. For example, while one storage compartment 50 is shown, the air cart 12 may include multiple storage compartments (e.g., 2, 3, 4, 5, or more) for storing the same or different types of particulate material. In such configurations, the air cart 12 may include multiple metering systems to independently meter the particulate material from each of the multiple storage compartments. For example, a first storage compartment may store seeds, while a second storage compartment may store a dry fertilizer. In such cases, the multiple metering systems may meter the respective particulate material into respective lines for distribution to the agricultural implement 10, or into the same lines to distribute the particulate material as a mixture. Regardless of the number of storage compartments 50 and/or the configuration of the product distribution system 60, the product distribution system mounting assembly 74 having the sliding interface 78 may be provided to enable the product distribution system 60 to move vertically relative to the brackets 76 and relative to the frame 52 of the air cart 12.

Figure 2:
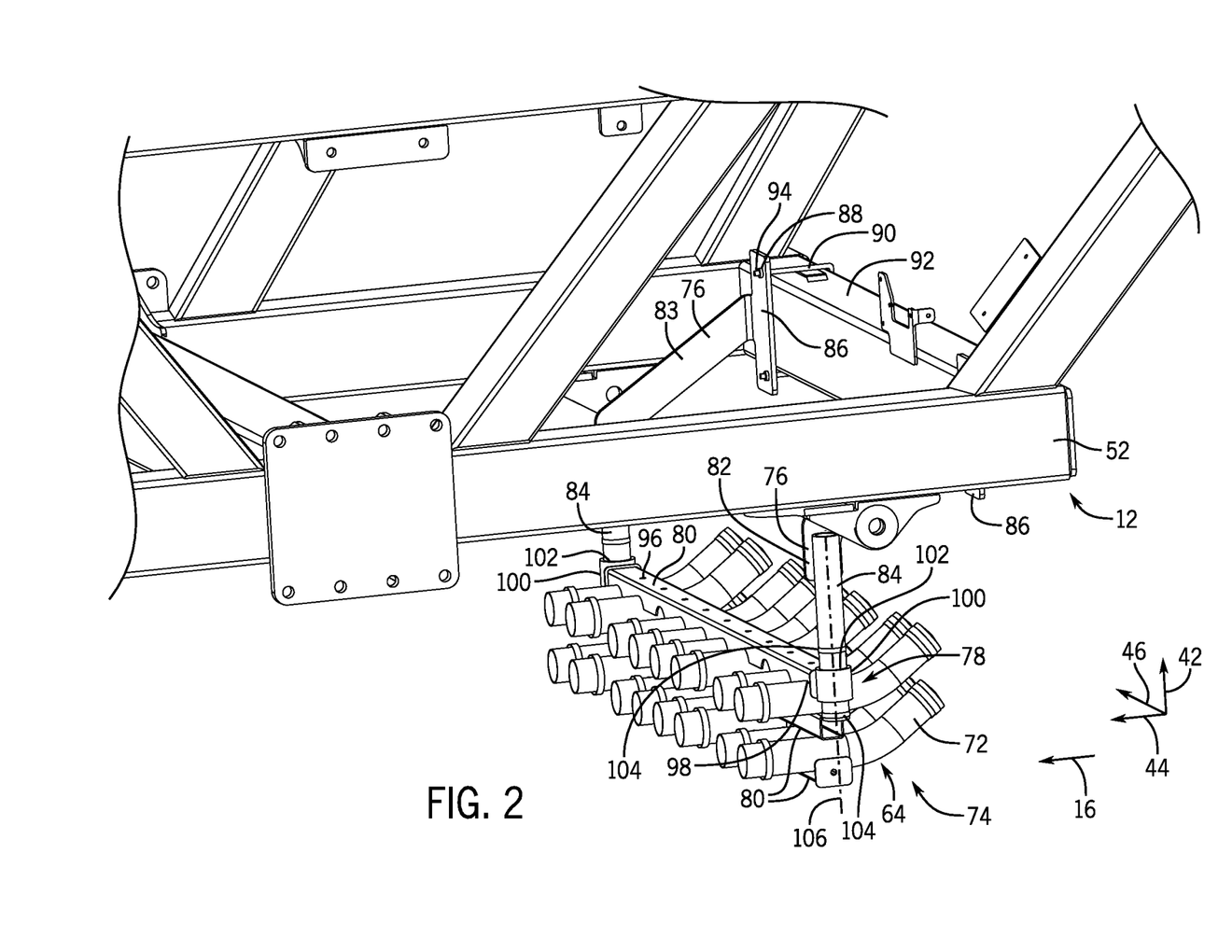
FIG. 2 is a perspective view of an embodiment of a product distribution system mounting assembly that may be employed within the air cart of FIG. 1.
Figure 3:
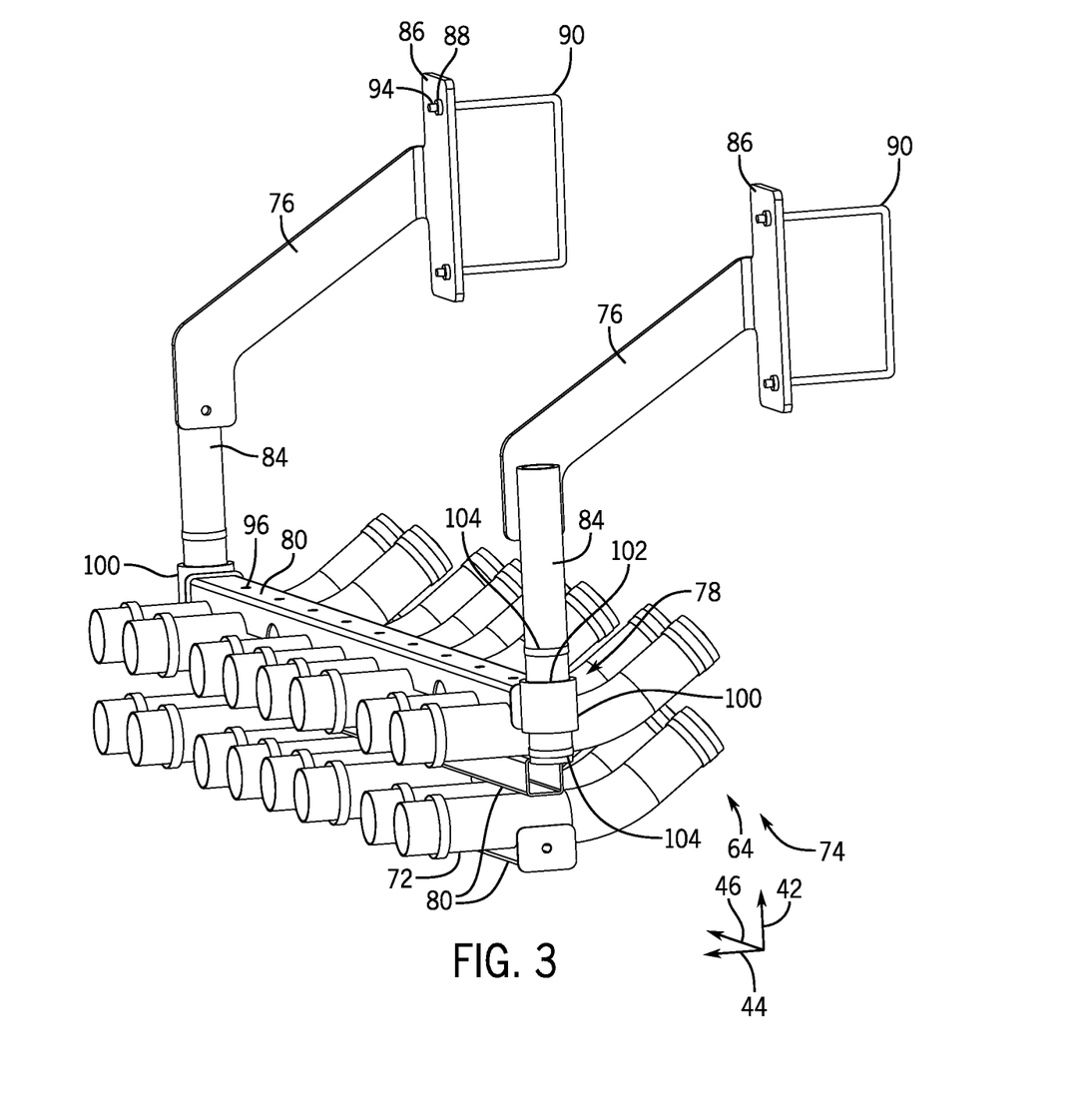
FIG. 3 is a perspective view of the product distribution system mounting assembly of FIG. 2.

FIG. 2 is a perspective view of an embodiment of the product distribution system mounting assembly 74 coupled to the air cart 12, and FIG. 3 is a perspective view of the product distribution system mounting assembly 74. As shown, the product distribution system mounting assembly 74 includes the brackets 76 positioned proximate to opposite lateral end portions of one or more crossbars 80 (e.g., laterally-extending crossbars). Each bracket 76 includes a vertically-extending portion 82 and an angled portion 83. Each bracket 76 also includes or is coupled (e.g., rigidly coupled; in a fixed position relative to; fastened via one or more fasteners, such as threaded wires, welds, or bolts) to a rod 84 (e.g., rod, bar) of the sliding interface 78, and each bracket 76 further includes a plate 86 (e.g., longitudinally-facing plate; in a plane perpendicular to the direction of travel 16 [FIG. 1]), which includes one or more openings 88 that are configured to receive a fastener (e.g., threaded wire, bolt) to couple the product distribution system mounting assembly 74 to the frame 52 of the air cart 12. As shown, the product distribution system mounting assembly 74 is coupled to the frame 52 via a wire 90 (e.g., threaded wire) that wraps around a crossbar 92 of the frame 52 of the air cart 12, extends through the openings 88, and is secured in place via nuts 94 positioned on end portions of the wire 90. However, it should be appreciated that the product distribution system mounting assembly 74 may be coupled to any portion of the frame 52 via any of a variety of fasteners. Furthermore, in the illustrated embodiment, the vertically-extending portion 82, the angled portion 83, and the plate 86 of the bracket 76 are integrally-formed as a single piece, and the rod 84 is a separate piece. However, it should be appreciated that each bracket 76 may have any of a variety of shapes, may be formed from multiple separate pieces that are coupled to one another, and/or may be integrally formed with the frame 12. The rod 84 may also be integrally formed with the bracket 76, a portion of the bracket 76, and/or the frame 52 of the air cart 12. Regardless of the particular arrangement and couplings, the rod 84 of the sliding interface 78 is rigidly coupled (e.g., in a fixed position relative to) to the frame 52 of the air cart 12.

In the illustrated embodiment, multiple crossbars 80 of the product distribution system mounting assembly 74 are fastened to one another via multiple fasteners 96 (e.g., bolts) that are spaced apart from one another along the lateral axis 46. As shown, the multiple crossbars 80 define one or more openings 98 (e.g., semi-circular) that receive the one or more connectors 72. The multiple crossbars 80 may fully or partially circumferentially surround a portion of each of the one or more connectors 72 when assembled and/or couple to the one or more connectors 72 (e.g., rigidly coupled; in a fixed position relative to) via an interference fit (e.g., friction fit, press fit), thereby blocking relative movement between the multiple crossbars 80 and the one or more connectors 72. In some embodiments, each of the one or more connectors 72 may include features, such as grooves (e.g., circumferentially-extending grooves formed in an outer wall); that engage with the multiple crossbars 80 to further facilitate coupling the multiple crossbars 80 to the one or more connectors 72 and/or blocking relative movement between the multiple crossbars 80 and the one or more connectors 72. In some embodiments, other than the product distribution system mounting assembly 74, no other structures directly contact both the one or more connectors 72 and the frame 52 of the air cart 12.

It should be appreciated that the product distribution system mounting assembly 74 may be coupled to the tubing assembly 64 in any of a variety of different ways. For example, while the illustrated embodiment includes multiple crossbars 80 stacked vertically and coupled to one another via the fasteners 96, the product distribution system mounting assembly 74 may instead include only a single crossbar (e.g., one-piece) with one or more openings to receive the one or more connectors 72 or the product distribution system mounting assembly 74 may include multiple crossbars coupled to one another in a different way and/or having one or more openings with different configurations. Thus, the product distribution system mounting assembly 74 may include any number of crossbars (e.g., 1, 2, 3, 4, 5 or more)

to support any number of the one or more connectors 72 (e.g., 1, 2, 3, 4, 5 or more) arranged in any number of rows (e.g., 1, 2, 3, 4, 5 or more). Furthermore, the one or more crossbars 80 may additionally or alternatively couple to (e.g., rigidly couple to; in a fixed position relative to) another tubular component of the tubing assembly 64, such as the metering system lines 70, or to another component of the product distribution system 60, such as the housing 68 of the metering system 62 (FIG. 1).

As discussed in more detail below, at least one of the one or more crossbars 80 includes or is coupled (e.g., rigidly coupled; in a fixed position relative to; fastened via one or more fasteners, such as threaded wires, welds, or bolts) to at least one sleeve 100 (e.g., sleeve; annular sleeve) of the sliding interface 78 that is configured to engage (e.g., slidingly engage) with one of the rods 84 of the sliding interface 78. In the illustrated embodiment, the sleeves 100 are positioned proximate to opposite lateral end portions of the one or more crossbars 80. Each of the sleeves 100 includes an opening 102 that is configured to receive the rod 84. When engaged, the rod 84 may extend completely through or across (e.g., protrude from a first side and from a second side along the vertical axis 42) the sleeve 100. The sleeve 100 may also to at least partially circumferentially surround the rod 84 (e.g., to block relative movement along the longitudinal axis 44 and the lateral axis 46).

Thus, the one or more crossbars 80 are slidingly coupled to the brackets 76 via the sliding interface 78, and the one or more crossbars 80 and the one or more connectors 72 may move along the vertical axis 42 relative to the brackets 76 and relative to the frame 52 of the air cart 12. The sliding interface 78 also blocks the one or more crossbars 80 and the one or more connectors 72 from moving along the longitudinal axis 44 and the lateral axis 46 relative to the brackets 76 and relative to the frame 52 of the air cart 12. In some embodiments, one or more stops 104 (e.g., radially-expanded portion; annular locking collar) may be provided to limit relative movement (e.g., a distance of travel) between the rod 84 relative to the sleeve 100. For example, one stop 104 may be provided about a lower portion of the rod 84 and/or one stop 104 may be provided about an upper portion of the rod 84. It should be appreciated the one or more stops 104 may have any of a variety of configurations (e.g., a sliding key-slot interface between the radially-outer surface of the rod 84 and the radially-inner surface of the sleeve 100) that limit the relative movement between the rod 84 and the sleeve 100. In some embodiments, the product distribution system mounting assembly 74 may be devoid of the stops 104, and instead, the second member 102 may maintain engagement with the rod 84 due to other connections (e.g., with the metering system housing 68 via the metering system lines 70) and/or relative component size (e.g., length of the rod 84 and/or the sleeve 100 along the vertical axis 42). It should be appreciated that the rod 84 and the sleeve 100 have corresponding cross-sectional shapes (e.g., circular, rectangular) to enable the rod 84 and the sleeve 100 to slidingly engage with one another. Furthermore, the rod 84 and the sleeve 100 may be coaxial and may each be aligned along an axis 106 (e.g., central axis), which may be parallel to the vertical axis 42 and/or generally orthogonal to the direction of travel 16 (FIG. 1).

While the sleeve 100 and the one or more crossbars 80 are shown as separate pieces, it should be appreciated that each crossbar 80 may have any of a variety of shapes, may be formed from multiple separate pieces that are coupled to one another, and/or may be integrally formed with the sleeve TOO. Furthermore, the sleeve 100 may be integrally formed with or coupled to any crossbar 80 of the one or more crossbars 80, the sleeve 100 may be coupled to multiple crossbars 80, and/or multiple physically separate sleeves 100 may be integrally formed with or coupled to multiple crossbars 80. Regardless of the particular arrangement and couplings, the sleeve 100 of the sliding interface 78 is rigidly coupled (e.g., in a fixed position relative to) to the product distribution system 60 (e.g., the tubular assembly 64 of the product distribution system 60 of the air cart 12).

Figure 4:
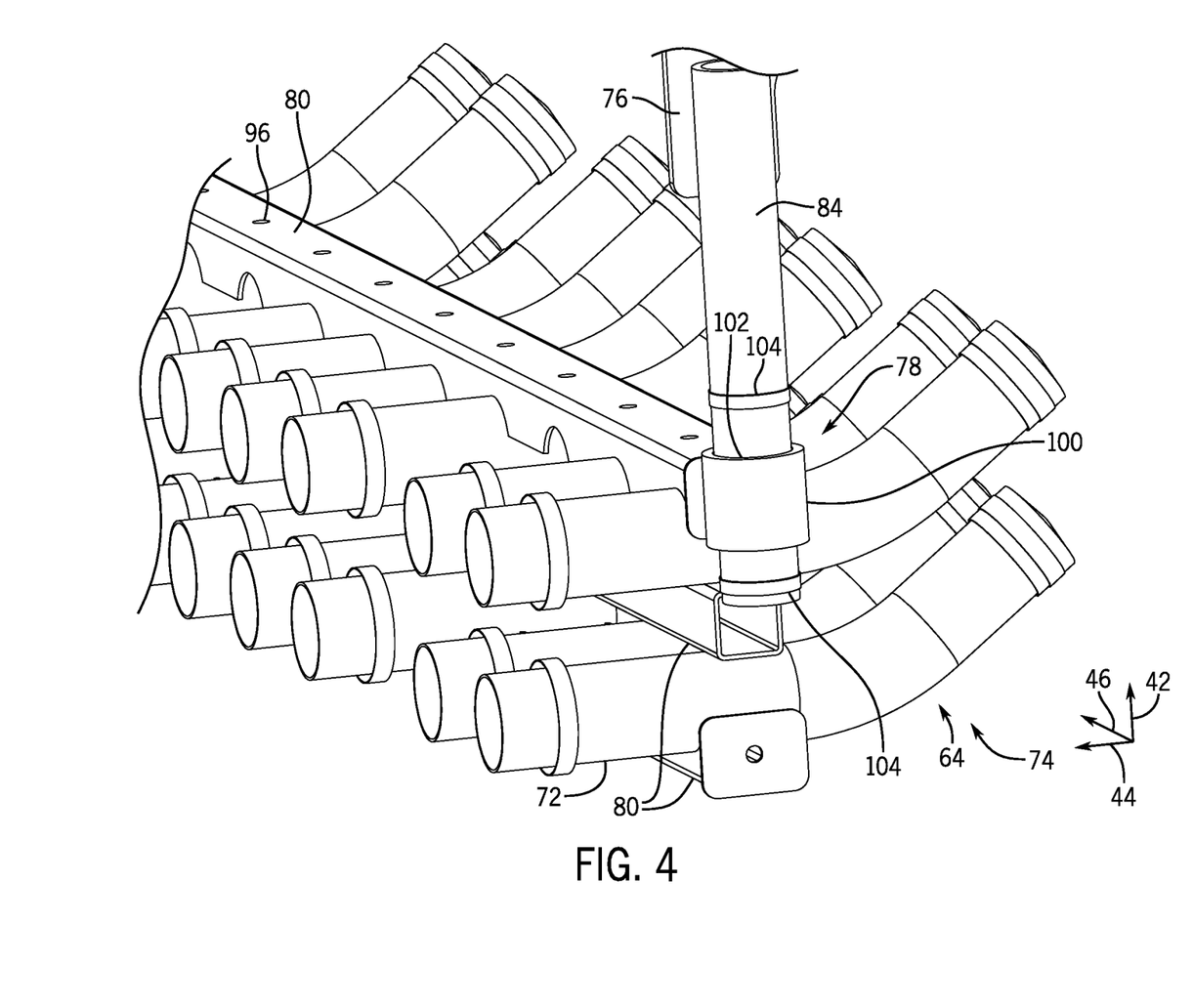
FIG. 4 is a perspective view of a portion the product distribution system mounting assembly of FIG. 2.
Figure 5:
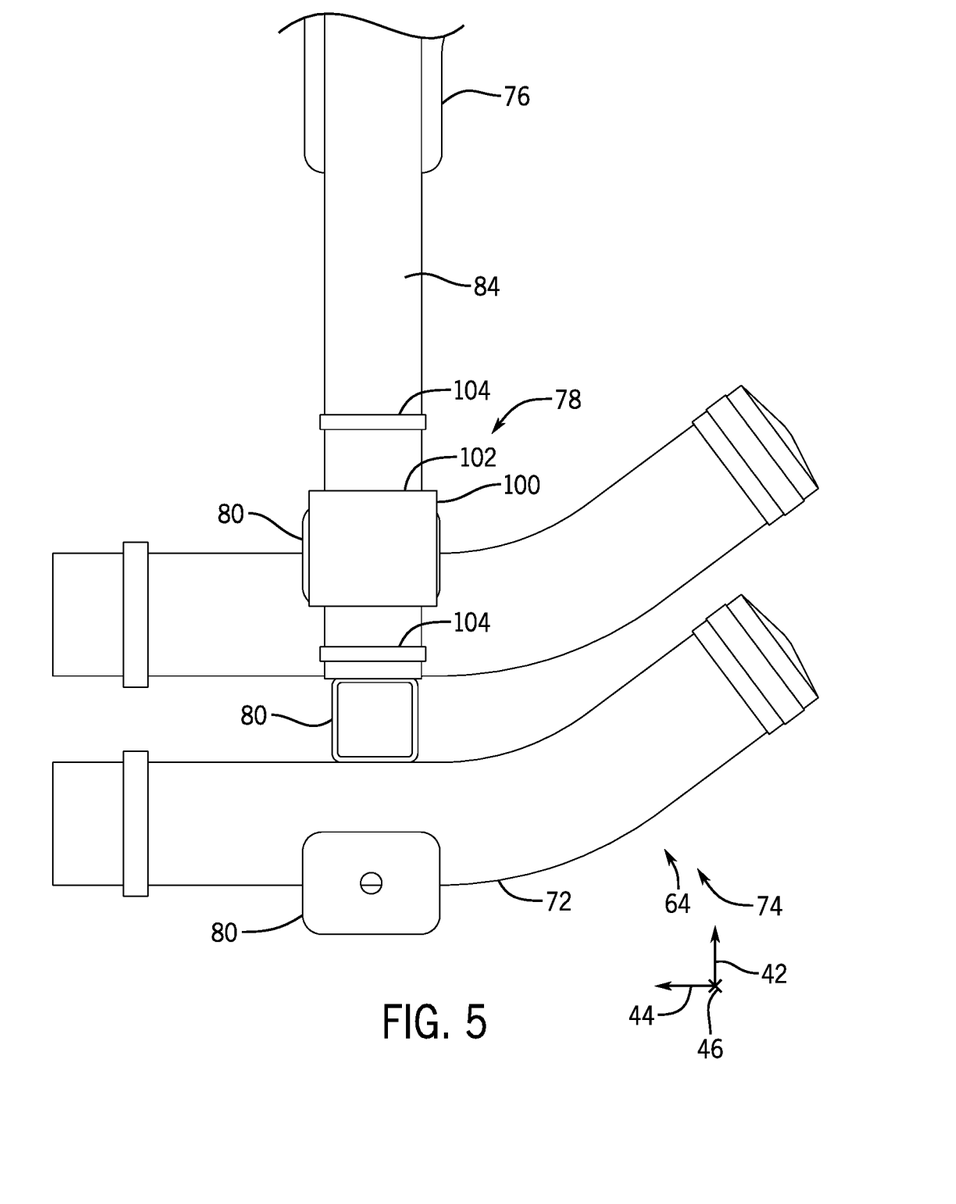
FIG. 5 is a side view of a portion product distribution system mounting assembly of FIG. 2.
Figure 6:
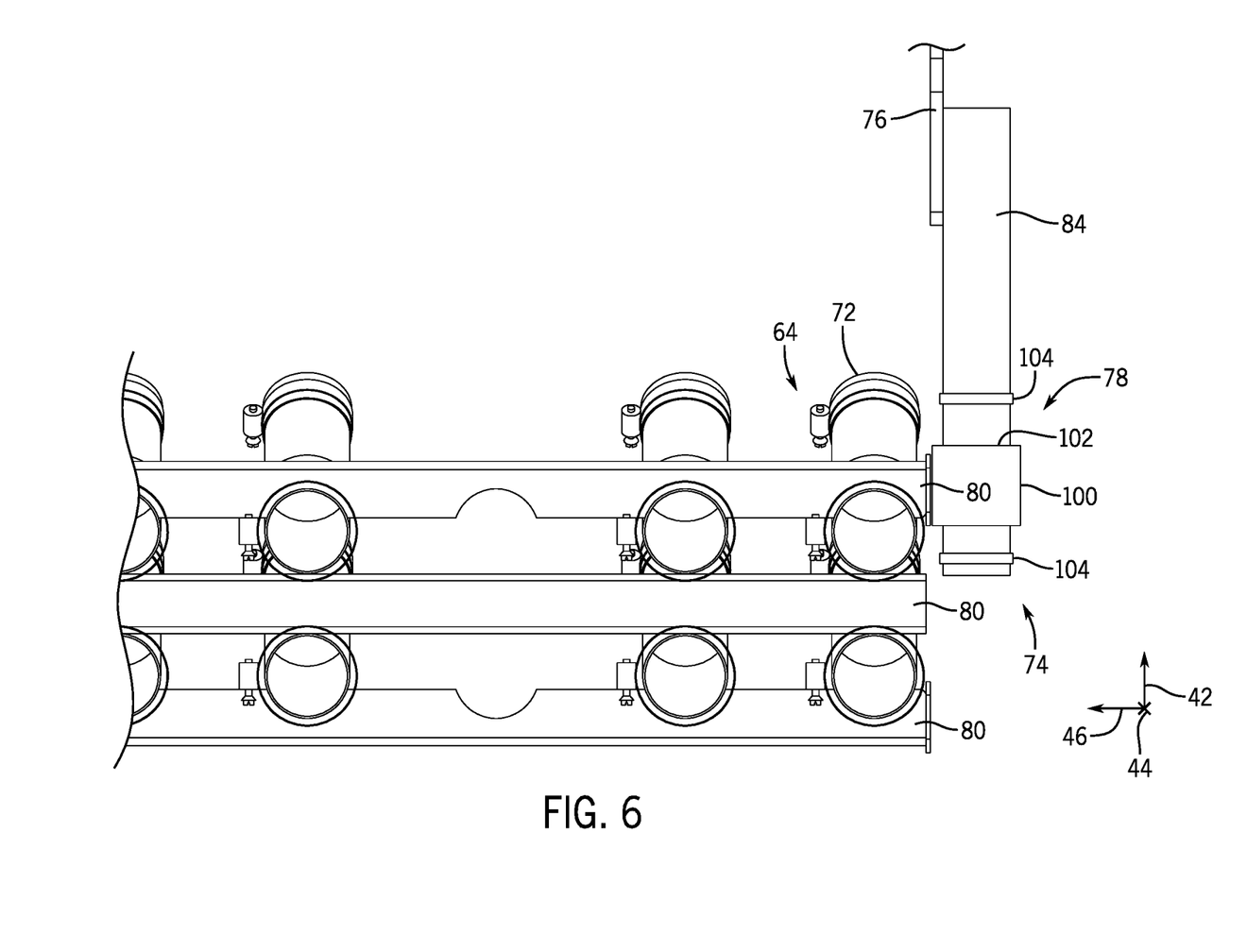
FIG. 6 is a front view of a portion of the product distribution system mounting assembly of FIG. 2.
Figure 7:
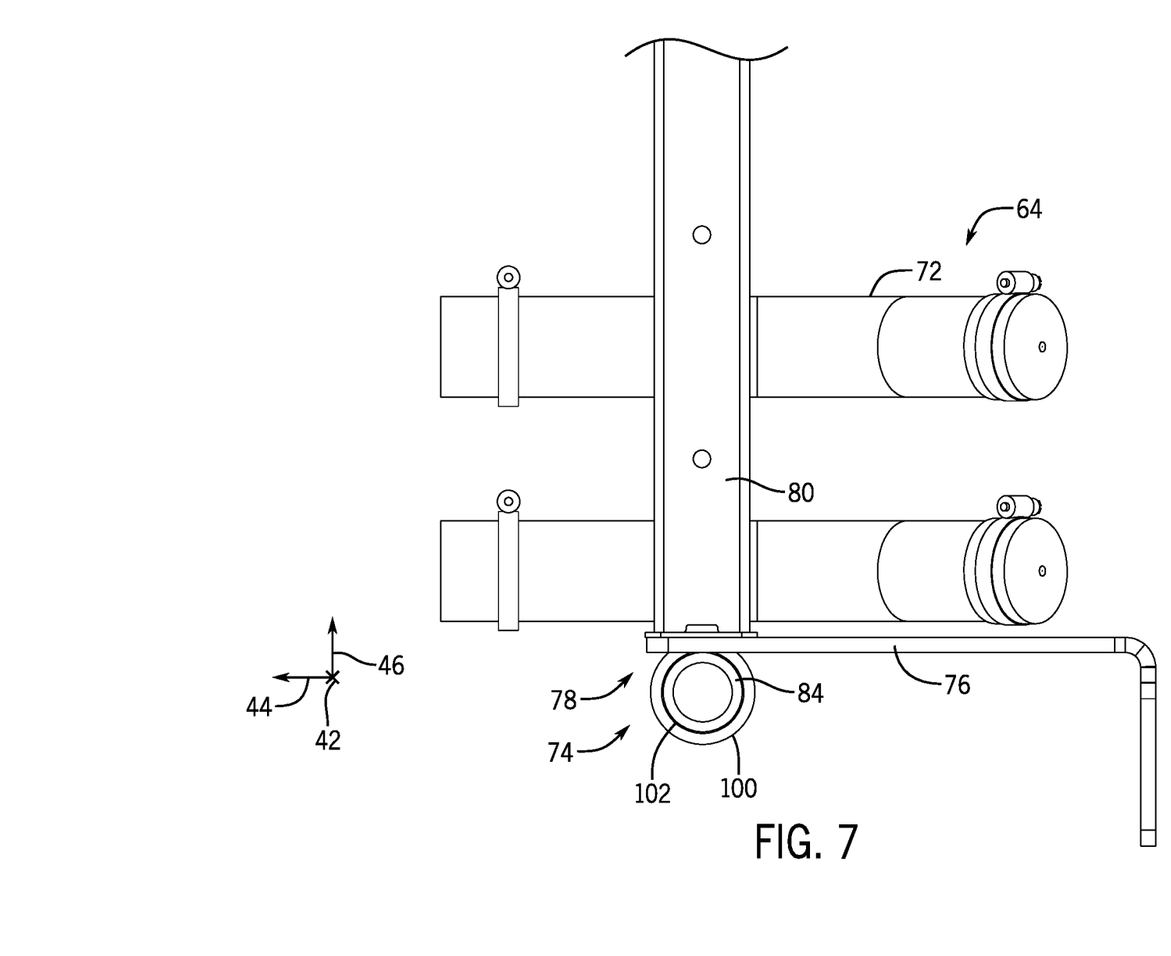
FIG. 7 is a top view of a portion of the product distribution system mounting assembly of FIG. 2.

Additional details of the product distribution system mounting assembly 74 are shown in FIGS. 4-7. In particular, FIG. 4 is a perspective view of a portion of the product distribution system mounting assembly 74, FIG. 5 is a side view of a portion of the product distribution system mounting assembly 74, FIG. 6 is a front view of the product distribution system mounting assembly 74, and FIG. 7 is a top view of the product distribution system mounting assembly 74, In FIG. 7, the stops 104 are removed to more clearly illustrate the sliding interface 78 between the rod 84 and the sleeve 100.

As shown, the multiple crossbars 80 support the one or more connectors 72 of the tubing assembly 64, and the multiple crossbars 80 are coupled to one another via the fasteners 96. At least one of the one or more crossbars 80 (e.g., the uppermost crossbar) is integrally formed with or rigidly coupled to the sleeves 100 of the sliding interface 78. As shown, each sleeve 100 includes the respective opening 102 that receives the respective rod 84, and each sleeve 100 at least partially circumferentially surrounds the respective rod 84. In this way, the product distribution system mounting assembly 74 enables movement of the one or more crossbars 80 and the tubing assembly 64 coupled thereto along the vertical axis 42 relative to the frame 52 of the air cart 12, while restraining or blocking movement of the one or more crossbars 80 and the tubing assembly 64 coupled thereto along the lateral axis 46 and the longitudinal axis 44 relative to the frame 52 of the air cart 12.

Figure 8:
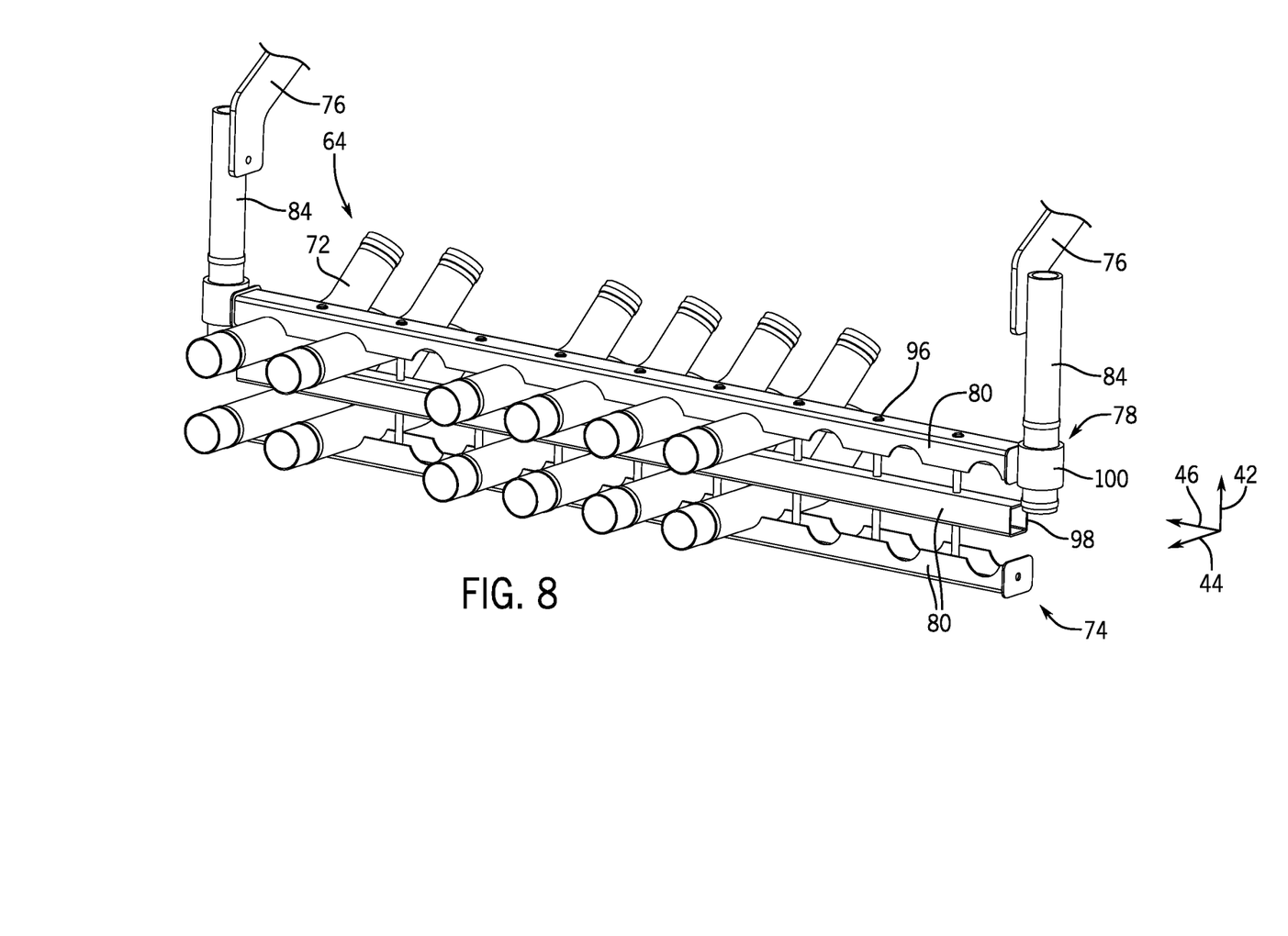
FIG. 8 is a perspective view of the product distribution system mounting assembly of FIG. 2 without a portion of a tubing assembly of a product distribution system of the air cart.

FIG. 8 is a perspective view of the product distribution system mounting assembly 74 without a portion of the tubing assembly 64 of the product distribution system 60 of the air cart 12. In particular, some of the one or more connectors 72 are removed to better illustrate features of the one or more crossbars 80. As shown, the multiple crossbars 80 are coupled to one another via the fasteners 96. Additionally, the multiple crossbars 80 define the one or more openings 98 that are configured to receive the one or more tubular components of the tubing assembly 64, such as the one or more connectors 72. The multiple crossbars 80 may fully or partially circumferentially surround a portion of each of the one or more connectors 72 when assembled and/or couple to the one or more connectors 72 (e.g., rigidly coupled; in a fixed position relative to) via an interference fit (e.g., friction fit, press fit), thereby blocking relative movement between the multiple crossbars 80 and the one or more connectors 72. In some embodiments, each of the one or more connectors 72 may include features, such as grooves (e.g., circumferentially-extending grooves formed in an outer wall), that engage with the multiple crossbars 80 to further facilitate coupling the multiple crossbars 80 to the one or more connectors 72 and/or blocking relative movement between the multiple crossbars 80 and the one or more connectors 72.

Figure 9:
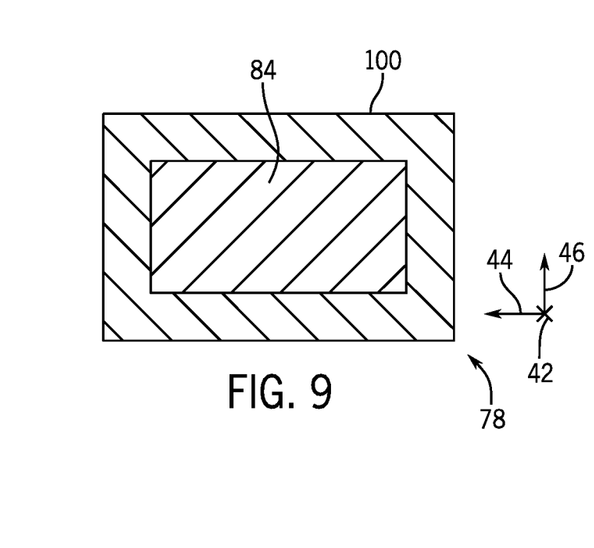
FIG. 9 is a top view of an embodiment of a sliding interface of a product distribution system mounting assembly that may be employed within the air cart of FIG. 1, wherein the sliding interface includes a rod and a sleeve each having a rectangular cross-sectional shape.

While the rod 84 and the sleeve 100 in FIGS. 1-7 include a circular cross-sectional shape (e.g., taken in a plane parallel to the lateral axis 46), it should be appreciated that the rod 84 and the sleeve 100 may have any suitable corresponding cross-sectional shapes. For example, FIG. 9 is a top view of an embodiment of the sliding interface 78 in which the rod 84 and the sleeve 100 have a rectangular cross-sectional shape.

Figure 10:
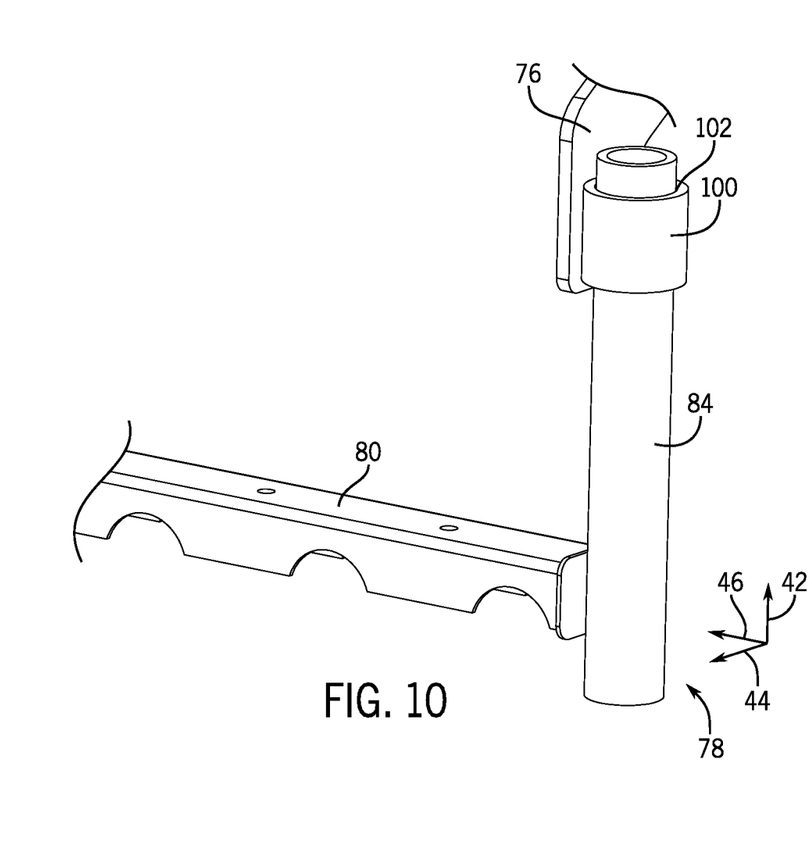
FIG. 10 is a perspective view of an embodiment of a product distribution system mounting assembly that may be employed within the air cart of FIG. 1, wherein the product distribution system mounting system includes a rod extending from a crossbar and a sleeve extending from a bracket.

Furthermore, while the rods 84 are shown as being rigidly coupled to the frame 52 of the air cart 12 (e.g., via the brackets 76) and the sleeves 100 are shown as being rigidly coupled to the product distribution system 60 (e.g., to the tubular assembly 64; via the one or more crossbars 80), it should be appreciated that instead the rods 84 be rigidly coupled to the frame 52 of the air cart 12 and the sleeves may be rigidly coupled to the product distribution system 60. Accordingly, the sliding interface 78 is more generally formed by a first member (which may be one of the rods 84 or the sleeves 100) rigidly coupled to the frame 52 of the air cart 12 and a second member (which may be the other one of the rods 84 or the sleeves 100) rigidly coupled to the product distribution system 60. For example, FIG. 10 illustrates the sliding interface 78 having the rod 84 extending from one of the one or more crossbars 80 and the sleeve 100 extending from the bracket 76. In such cases, the rod 84 may be received and slide within the opening 102 of the sleeve 100 to enable movement of the one or more crossbars 80 and the tubing assembly 64 coupled thereto along the vertical axis 42 relative to the frame 52 of the air cart 12, while restraining or blocking movement of the one or more crossbars 80 and the tubing assembly 64 coupled thereto along the lateral axis 46 and the longitudinal axis 44 relative to the frame 52 of the air cart 12. Although not shown, the stops 104 shown in FIGS. 2-6 may be provided to limit the relative movement along the vertical axis 42.

Figure 11:
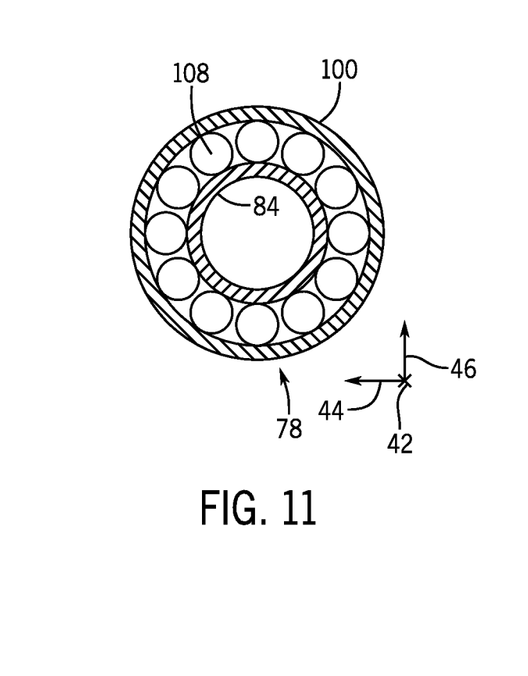
FIG. 11 is a cross-sectional top view of an embodiment of a sliding interface of the product distribution system mounting assembly of FIG. 2, wherein the sliding interface includes roller bearings.
Figure 12:
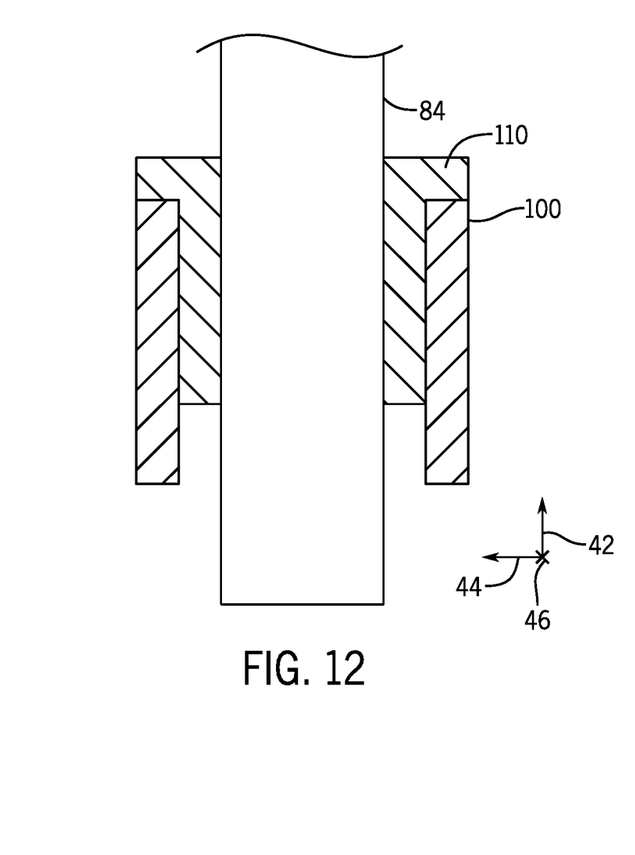
FIG. 12 is a cross-sectional side view of an embodiment of a sliding interface of the product distribution system mounting assembly of FIG. 2, wherein the sliding interface includes a bushing.

The product distribution mounting assembly 74 may include various other features, such as various types of bearings, which facilitate the disclosed techniques. For example, FIG. 11 is a cross-sectional top view of an embodiment of the sliding interface 78 having a roller bearing assembly 108 positioned radially between each rod 84 and its respective sleeve 100. FIG. 12 is a cross-sectional side view of an embodiment of the sliding interface 78 having a bushing 110 (e.g., an annular bushing; sleeve bearing) positioned radially between each rod 84 and its respective sleeve 100. The roller bearing assembly 108 and the bushing 110 may facilitate relative movement of the rod 84 and the sleeve 100.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A product distribution system mounting assembly, comprising:
    a first member configured to rigidly couple to a frame of an agricultural apparatus; and
    a second member configured to rigidly couple to a plurality of tubular components of a product distribution system of the agricultural apparatus;
    wherein at least a respective portion of the first member and at least a respective portion of the second member are coaxial and are configured to engage with one another to form a sliding interface that enables the plurality of tubular components to move along a vertical axis relative to the frame as the agricultural apparatus moves in a direction of travel through a field.

2. The product distribution system mounting assembly of claim 1, wherein the sliding interface is configured to block movement of the plurality of tubular components along a lateral axis relative to the frame as the agricultural apparatus moves in the direction of travel through the field.

3. The product distribution system mounting assembly of claim 2, wherein the sliding interface is configured to block movement of the plurality of tubular components along a longitudinal axis relative to the frame as the agricultural apparatus moves in the direction of travel through the field.

4. The product distribution system mounting assembly of claim 1, wherein the first member comprises a rod and the second member comprises a sleeve configured to receive the rod, or the second member comprises the rod and the first member comprises the sleeve configured to receive the rod.

5. The product distribution system mounting assembly of claim 1, comprising a bearing positioned radially between the first member and the second member.

6. The product distribution system mounting assembly of claim 1, comprising at least one crossbar configured to support and to rigidly couple to the plurality of tubular components.

7. The product distribution system mounting assembly of claim 6, wherein the second member is rigidly coupled to the plurality of tubular components via the at least one crossbar.

8. The product distribution system mounting assembly of claim 1, comprising a stop configured to limit a distance of travel of the second member relative to the first member along the vertical axis.

9. The product distribution system mounting assembly of claim 1, comprising a bracket configured to rigidly couple to the frame, wherein the first member is rigidly coupled to the frame via the bracket.

10. The product distribution system mounting assembly of claim 1, wherein the sliding interface enables the plurality of tubular components to move along the vertical axis relative to the frame as the plurality of tubular components delivers a particulate material to the field as the agricultural apparatus moves in the direction of travel through the field.

11. The product distribution system mounting assembly of claim 1, wherein the sliding interface enables the plurality of tubular components to move along the vertical axis relative to the frame as the plurality of tubular components transfers a particulate material from a metering system to an agricultural implement of the agricultural apparatus.

12. The product distribution system mounting assembly of claim 1, wherein at least the respective portion of the first member circumferentially surrounds at least the respective portion of the second member, or at least the respective portion of the second member circumferentially surrounds at least the respective portion of the first member.

13. The product distribution system mounting assembly of claim 1, comprising at least one crossbar configured to rigidly couple to the plurality of tubular components, wherein the second member is integrally formed with or rigidly coupled to the at least one crossbar to thereby rigidly couple to the plurality of tubular components.

14. The product distribution system mounting assembly of claim 13, wherein the at least one crossbar comprises a first crossbar and a second crossbar stacked along the vertical axis relative to one another and coupled to one another via at least one fastener.

15. The product distribution system mounting assembly of claim 14, wherein the first crossbar and the second crossbar are configured to support the plurality of tubular components in one or more openings defined between the first crossbar and the second crossbar along the vertical axis.

16. The product distribution system mounting assembly of claim 13, wherein the at least one crossbar comprises a plurality of openings configured to receive the plurality of tubular components.

17. The product distribution system mounting assembly of claim 16, wherein each opening of the plurality of openings comprises a semi-circular cross-sectional shape and enables the at least one crossbar to couple to each tubular component of the plurality of tubular components via an interference fit.

18. The product distribution system mounting assembly of claim 1, wherein the sliding interface is configured to block movement of the plurality of tubular components along a lateral axis and along a longitudinal axis relative to the frame as the agricultural apparatus moves in the direction of travel through the field.

19. The product distribution system mounting assembly of claim 1, wherein the plurality of tubular components comprises a plurality of connectors that are configured to fluidly couple respective first lines that extend from a metering system of the product distribution system to respective second lines that extend to an agricultural implement of the agricultural apparatus.

20. The product distribution system mounting assembly of claim 1, comprising a strain gauge configured to monitor a weight of a particulate material carried by the agricultural apparatus, wherein the product distribution system mounting assembly is configured to block transfer of forces along the vertical axis through the product distribution system from the frame to the strain gauge.

\* \* \* \* \*